United States Patent
Kawachiya et al.

(10) Patent No.: US 8,201,178 B2
(45) Date of Patent: Jun. 12, 2012

(54) PREVENTING DELAY IN EXECUTION TIME OF INSTRUCTION EXECUTED BY EXCLUSIVELY USING EXTERNAL RESOURCE

(75) Inventors: Kiyokuni Kawachiya, Kanagawa-ken (JP); Michiaki Tatsubori, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 12/612,920

(22) Filed: Nov. 5, 2009

(65) Prior Publication Data

US 2010/0122260 A1 May 13, 2010

(30) Foreign Application Priority Data

Nov. 7, 2008 (JP) ................................ 2008-286523

(51) Int. Cl.
 *G06F 9/46* (2006.01)
(52) U.S. Cl. ........ 718/102; 718/103; 718/104; 709/226; 711/147; 711/148; 711/149; 711/150; 711/152; 711/159; 712/220
(58) Field of Classification Search ......................... None
 See application file for complete search history.

(56) References Cited

U.S. PATENT DOCUMENTS

| 7,188,344 B1 * | 3/2007 | Blue ............................. 718/106 |
| 7,962,707 B2 * | 6/2011 | Kaakani et al. ................ 711/159 |

FOREIGN PATENT DOCUMENTS

| JP | 5-120041 A | | 5/1993 |
| JP | 2000-099351 A | | 4/2000 |
| JP | 2006-126975 | | 5/2006 |
| JP | 2006126975 | * | 5/2006 |
| JP | 2007-004595 A | | 1/2007 |
| JP | 2007-086838 | | 4/2007 |
| JP | 2007086838 | * | 4/2007 |
| JP | 2007-299417 A | | 11/2007 |
| JP | 2008-112400 A | | 5/2008 |

* cited by examiner

*Primary Examiner* — Emerson Puente
*Assistant Examiner* — Sisley Kim
(74) *Attorney, Agent, or Firm* — Vazken Alexanian (57) ABSTRACT

Disclosed are computer systems, a plurality of methods and a computer program for preventing a delay in execution time of one or more instructions. The computer system includes: a lock unit for executing an instruction to acquire exclusive-use of the external resource and an instruction to release the exclusive-use of the external resource in the one or more threads; a counter unit for increasing or decreasing a value of a corresponding one of counters respectively associated with the threads; and a controller for controlling an execution order of the instructions to be executed by exclusively using the external resource and instructions that causes a delay in the execution time of the instructions to be executed by exclusively using the external resource.

18 Claims, 8 Drawing Sheets

PREVENTING DELAY IN EXECUTION TIME OF INSTRUCTION EXECUTED BY EXCLUSIVELY USING EXTERNAL RESOURCE

CROSS REFERENCE TO RELATED APPLICATIONS

This application claims priority under 35 U.S.C. §119 from Japanese Patent Application number 2008-286523, filed on Nov. 7, 2008, the entire contents of which are incorporated herein by reference.

BACKGROUND OF THE INVENTION

A large-scale system receiving a large amount of access often employs a cluster structure for improving processing performance. Multiple servers for performing transaction processing are prepared in the cluster structure. Then, the multiple servers access a shared external database (hereinafter, referred to as a shared DB).

In the cluster structure, one of the servers locks a record in the shared DB for along time in some cases. Once the record has been locked, a server other than the one that has locked the record can no longer access the record. For this reason, when a server other than the one that has locked the record attempts to access the locked record, the server is made to wait and cannot proceed its own processing until the record is unlocked. Accordingly, there is a risk that the employing of the cluster system ends up with no improvement in performance of the system.

In addition, in a case where the server operates in a program execution environment such as a JAVA™ processing system, as in a case of a WebSphere Application Server™ (hereinafter, referred to as a WAS), housekeeping processing such as garbage collection (hereinafter, referred to as GC) is performed in the program execution environment. When the housekeeping processing is performed during the period of the lock of a record, the processing of the server that has locked the record is delayed, thus resulting in a situation where a single server keeps the lock for a long time.

Japanese Patent Application Publication No. 2007-086838 discloses means for reducing memory allocation for new object creation by reusing an object temporarily created at the time of communications and thereby for suppressing GC execution. However, as described, this means for suppressing GC execution is not one for suppressing the occurrence of GC during the lock of an external resource.

Japanese Patent Application Publication No. 2006-126975 discloses means for controlling GC by adjusting priorities of an original task and the task of GC. However, this means for controlling GC assumes that the original task and the task of GC can be executed in parallel. Accordingly, the delay in the processing time of the original task due to the execution of GC is not considered as a problem.

A system for preventing a situation where an external resource is locked for a long time by a single server is desirable.

BRIEF SUMMARY OF THE INVENTION

Aspects of the invention disclose computer systems, methods and a computer program for preventing a delay in execution time of one or more instructions each being executed by exclusively using an external resource in a computer program execution environment for executing one or more threads in each of which instructions to be executed by exclusively using an external resource are executed.

One aspect of the invention discloses a computer system that includes:

a lock unit for executing an instruction to acquire exclusive-use of the external resource and an instruction to release the exclusive-use thereof, in the one or more threads, a counter unit for increasing or decreasing, in accordance with the execution of the instruction by the lock unit, a value of a corresponding one of counters respectively associated with the threads, and a controller for controlling, in accordance with the value of the counter or the change in the value of the counter, an execution order of the instructions to be executed by exclusively using the external resource and instructions that cause a delay in the execution time of the instructions to be executed by exclusively using the external resource.

According to an aspect of the invention, the controller executes the instructions that cause a delay in the execution time of the instructions to be executed by exclusively using the external resource, in a case where a memory size usable for memory allocation to be performed during execution of a program is smaller than a value to be obtained on the basis of the sum of the values of the counters.

According to yet another aspect of the invention, the controller executes the instructions that cause a delay in the execution time of the instructions to be executed by exclusively using the external resource, in a case where the sum of the values of the counters decreases, and also where a memory size usable for memory allocation to be performed during execution of a program is smaller than a value obtained again on the basis of the decreased sum of the values of the counters.

According to another aspect of the invention, the computer system further includes a first change unit for changing, in accordance with an increase or decrease in the sum of the values of the counters, a priority of the thread in which the instructions that cause a delay in the execution time of the instructions to be executed by exclusively using the external resource are executed.

According to an aspect of the invention, in a case where the sum of the values of the counters is large, the first change unit provides a low priority to the thread in which the instructions that cause a delay in the execution time of the instructions to be executed by exclusively using the external resource are executed.

According to an aspect of the invention, the controller executes the instructions in the threads in descending order of the priorities of the threads.

According to an aspect of the invention, the computer system further includes a second change unit for changing, in accordance with an increase or decrease in each of the counters, a priority of the thread in association with the counter.

According to an aspect of the invention, the second change unit provides a high priority to the thread in association with the counter having a large value.

According to an aspect of the invention, the controller executes the instructions included in the threads in descending order of the priorities of the threads.

According to an aspect of the invention, when increasing a value of a number-of-execution-times counter provided to each method, the controller provides, as a weight, the value of the counter in association with the thread in which the method is executed. Because of the provision of the weight, the execution of instructions to shorten the execution time of instructions to be executed by exclusively using an external resource can be promoted.

According to an aspect of the invention, the computer system further includes a calculator for obtaining the value of the number-of-execution-times counter in accordance with the execution of the method in the thread. In case the value of the number-of-execution-times counter is larger than a threshold, the controller executes instructions to shorten the execution time of the instructions to be executed by exclusively using the external resource, for each of the methods respectively associated with the threads.

According to an aspect of the invention, the instructions to shorten the execution time of the instructions to be executed by exclusively using the external resource are instructions that execute just in time (hereinafter, JIT) compiling, and in a case where the value of the number-of-execution-times counter is larger than the threshold, the controller adds the method in association with the number-of-execution-times counter in a list of the methods to be subjected to JIT compiling.

According to an aspect of the invention, the counter unit increases the value of a corresponding one of the counters before acquisition of the exclusive-use of the external resource in response to the execution of the instruction to acquire the exclusive-use thereof and, in accordance with the increase in the value of the counter, the controller executes, before the acquisition of the exclusive-use of the external resource, the instructions that cause a delay in the execution time of the instructions to be executed by exclusively using the external resource.

According to an aspect of the invention, the counter unit decreases the value of a corresponding one of the counters after release of the exclusive-use of the external resource, in response to the execution of the instruction to release the exclusive-use thereof and in accordance with the decrease in the value of the counter, the controller executes the instructions that cause a delay in the execution time of the instructions to be executed by exclusively using the external resource.

According to an aspect of the invention, the counter unit increases the value of a corresponding one of the counters in accordance with the execution of the instruction to acquire the exclusive-use of the external resource, and the counter unit decreases the value of a corresponding one of the counters in accordance with the execution of the instruction to release the exclusive-use thereof.

According to an aspect of the invention, the computer program execution environment is a JAVA processing system.

According to an aspect of the invention, the external resource includes a database, and the exclusive-use of the external resource includes exclusive-use of the database resource.

According to an aspect of the invention, the instructions that cause a delay in the execution time of the instructions to be executed by exclusively using the external resource are instructions to execute garbage collection.

According to an aspect of the invention, the instructions that cause a delay in the execution time of the instructions to be executed by exclusively using the external resource are instructions to execute JIT compiling.

Other embodiments disclose another computer system, a plurality of methods and a computer program for preventing a delay in execution time of one or more instructions each being executed by exclusively using an external resource in a computer program execution environment for executing one or more threads in each of which instructions to be executed by exclusively using an external resource are executed.

BRIEF DESCRIPTION OF THE DRAWINGS

For a more complete understanding of the invention and the advantage thereof, reference is now made to the following description taken in conjunction with the accompanying drawings.

DETAILED DESCRIPTION OF THE INVENTION

Some of the embodiments of the invention also provide a computer system for preventing a delay in execution time of one or more instructions each being executed by exclusively using an external resource in a computer program execution environment for executing one or more threads in each of which instructions to be executed by exclusively using an external resource are executed. The computer system includes:

a lock unit for executing an instruction to acquire exclusive-use of the external resource and an instruction to release the exclusive-use thereof in the one or more threads;

a counter unit for increasing or decreasing, in accordance with execution of the instruction to acquire exclusive-use of the external resource or the instruction to release the exclusive-use thereof, the sum of values of counters of all the threads; and a controller for controlling, in accordance with the sum of the values of the counters or a change in the sum of the values of the counters, an execution order of the instructions to be executed by exclusively using the external resource and instructions that cause a delay in the execution time of the instructions to be executed by exclusively using the external resource.

The embodiments of the invention also provide a method for preventing a delay in execution time of one or more instructions each being executed by exclusively using an external resource in a computer program execution environment for executing one or more threads in each of which instructions to be executed by exclusively using an external resource are executed. The method includes the steps of:

executing an instruction to acquire exclusive-use of the external resource and an instruction to release the exclusive-use thereof in the thread;

increasing or decreasing, in accordance with execution of the instruction to acquire exclusive-use of the external resource or the instruction to release the exclusive-use thereof, a value of a corresponding one of counters respectively associated with the threads; and controlling, in accordance with the value of the counter or the change in the value of the counter, an execution order of the instructions to be executed by exclusively using the external resource and instructions that cause a delay in the execution time of the instructions to be executed by exclusively using the external resource.

According to an aspect of the invention, the method further includes the following step of: executing the instructions that cause a delay in the execution time of the instructions to be executed by exclusively using the external resource, in a case where a memory size usable for memory allocation to be performed during execution of a program is smaller than a value to be obtained on the basis of the sum of the values of the counters.

According to an aspect of the invention, the method further includes the following step of: executing the instructions that cause a delay in the execution time of the instructions to be executed by exclusively using the external resource, in a case where the sum of the values of the counters decreases, and also a memory size usable for memory allocation to be performed during execution of a program is smaller than a value obtained again on the basis of the decreased sum of the values of the counters.

Here, the step of executing the instructions that cause a delay in the execution time of the instructions to be executed by exclusively using the external resource further includes the step of calculating the value to be obtained on the basis of the sum of the values of the counters, in accordance with the following formula: $T/(1+k \times N)$, where T equals a threshold of a memory size that is used when the values of the counters are not used, and that starts the instructions that cause a delay in the execution time of the instructions to be executed by exclusively using the external resource, k equals a parameter for adjusting the value to be obtained on the basis of the sum of the values of the counters, and N equals the sum of the values of the counters.

According to an aspect of the invention, the method further causes the computer system to execute the following step of: changing, in accordance with an increase or decrease in the sum of the values of the counters, a priority of the thread in which the instructions that cause a delay in the execution time of the instructions to be executed by exclusively using the external resource are executed.

According to an aspect of the invention, the method further includes the following step of: in a case where the sum of the values of the counters is large, providing a low priority to the thread in which the instructions that cause a delay in the execution time of the instructions to be executed by exclusively using the external resource are executed.

According to an aspect of the invention, the method further includes the following step of: executing the instructions in the threads in descending order of the priorities of the threads.

According to an aspect of the invention, the method further includes the following step of: changing, in accordance with an increase or decrease in each of the counters, a priority of the thread in association with the counter.

According to an aspect of the invention, the method further includes the following step of: providing a high priority to the thread in association with the counter having a large value.

According to an aspect of the invention, the method includes the following step of: executing the instructions included in the threads in descending order of the priorities of the threads.

According to an aspect of the invention, the method further includes the following step of: when increasing a value of a number-of-execution-times counter provided for each method, providing, as a weight, the value of the counter in association with the thread in which a method is executed. Because of the provision of the weight, the execution of instructions to shorten the execution time of instructions to be executed by exclusively using an external resource can be promoted.

According to an aspect of the invention, the method further includes the steps of:

obtaining the value of the number-of-execution-times counter in accordance with the execution of the method in the thread; and in a case where the value of the number-of-execution-times counter is larger than a threshold, executing instructions to shorten the execution time of the instructions to be executed by exclusively using the external resource, for each of the methods respectively associated with the threads.

According to an aspect of the invention, the method further includes the following step of: in a case where the value of the number-of-execution-times counter is larger than the threshold, adding the method in association with the number-of-execution-times counter in a list of the methods to be subjected to JIT compiling. Here, the instructions to shorten the execution time of the instructions to be executed by exclusively using the external resource are instructions to execute JIT compiling.

According to an aspect of the invention, the method further includes the steps of:

increasing the value of a corresponding one of the counters before acquisition of the exclusive-use of the external resource, in response to the execution of the instruction to acquire the exclusive-use thereof, and in accordance with the increase in the value of the counter, executing, before the acquisition of the exclusive-use of the external resource, the instructions that cause a delay in the execution time of the instructions to be executed by exclusively using the external resource.

According to an aspect of the invention, the method further includes the following steps of:

decreasing the value of a corresponding one of the counters after release of the exclusive-use of the external resource, in response to the execution of the instruction to release the exclusive-use thereof, and in accordance with the decrease in the value of the counter, executing the instructions that cause a delay in the execution time of the instructions to be executed by exclusively using the external resource.

According to an aspect of the invention, the method further includes the following steps of:

increasing the value of a corresponding one of the counters in accordance with the execution of the instruction to acquire the exclusive-use of the external resource, and decreasing the value of a corresponding one of the counters in accordance with the execution of the instruction to release the exclusive-use thereof.

Furthermore, embodiments of the invention also provide a method for preventing a delay in execution time of one or more instructions each being executed by exclusively using an external resource in a computer program execution environment for executing one or more threads in each of which instructions to be executed by exclusively using an external resource are executed. The method includes the following steps of:

executing an instruction to acquire exclusive-use of the external resource and an instruction to release the exclusive-use thereof in the thread;

increasing or decreasing, in accordance with execution of the instruction to acquire exclusive-use of the external resource or the instruction to release the exclusive-use thereof, the sum of values of counters of all the threads; and controlling, in accordance with the sum of the values of the counters or a change in the sum of the values of the counters, an execution order of the instructions to be executed by exclusively using the external resource and instructions that causes a delay in the execution time of the instructions to be executed by exclusively using the external resource.

According to an aspect of the invention, the method further includes the following step of: when increasing a value of a number-of-execution-times counter provided for each method, providing, as a weight, the value of the counter in association with the thread in which a method is executed. Because of the provision of the weight, the execution of instructions to shorten the execution time of instructions to be executed by exclusively using an external resource can be promoted.

Some embodiments of the invention also provide a method for preventing a delay in execution time of one or more instructions each being executed by exclusively using a database resource in a JAVA processing system for executing one or more threads in each of which the instructions to be executed by exclusively using the database resource are executed. The method includes the following steps of:

executing an instruction to acquire exclusive-use of the external resource and an instruction to release the exclusive-use thereof in the thread;

increasing or decreasing, in accordance with execution of the instruction to acquire exclusive-use of the external resource or the instruction to release the exclusive-use thereof, a value of a corresponding one of counters respectively associated with the threads; and controlling, in accordance with the value of the counter or a change in the value of the counter, an execution order of the instructions to be executed by exclusively using the database resource, and garbage collection or just in time (JIT) compiling.

Embodiments of the invention further provide a computer program for preventing a delay in execution time of one or more instructions each being executed by exclusively using an external resource in a computer program execution environment for executing one or more threads in each of which instructions to be executed by exclusively using an external resource are executed. The computer program causes a computer system to execute each of the steps in the method according to any of the aspects.

In an embodiment of the invention, a set of modules such as runtime modules required for executing a program is prepared in a "computer program execution environment." The computer program execution environment differs depending on a development tool used for development of the program. The computer program execution environment in the embodiment of the invention is a JAVA processing system, for example.

In the embodiment of the invention, a "thread" refers to a unit of a processing flow of a program. There may be one or multiple threads in the embodiment of the invention. Furthermore, a process in this description includes the one or more threads.

In the embodiment of the invention, an "external resource" refers to a resource commonly accessible by multiple processes. A computer executing the processes is not limited to one, and multiple computers may execute the processes. Examples of the external resource include hardware, a database and a file. The hardware herein is a hard disk drive, for example. The database is, for example, a relational database. The file is, for example, a text file, a spreadsheet file or a book file.

In the embodiment of the invention, an "exclusive-use acquisition instruction" is an instruction to acquire a lock in order to start exclusive usage of the external resource. The "exclusive-use acquisition instruction" is a "select for update" request in database access, for example. The "exclusive-use acquisition instruction" is executed in the thread.

In the embodiment of the invention, an "exclusive-use release instruction" is an instruction to release the lock in order to end the exclusive usage of the external resource. The "exclusive-use release instruction" is, for example, a "commit" request in database access. The "exclusive-use release instruction" is executed in the thread.

In the embodiment of the invention, "instructions to be executed by exclusively using the external resource are executed" are instructions to exclusively use the external resource. The "instructions to be executed by exclusively using the external resource are executed" are instructions given to the external resource from when the lock is acquired to when the lock is released. The "instructions to be executed by exclusively using the external resource are executed" are executed in the thread.

In the embodiment of the invention, "instructions to cause a delay in execution of instructions to be executed by exclusively using an external resource" are instructions that cause a delay in execution of the instruction to be executed while using the external resource, if the instructions are executed during the execution of the instructions to be executed by exclusively using the external resource.

The "instructions to cause a delay in execution of instructions to be executed by exclusively using an external resource" includes housekeeping processing. The housekeeping processing is processing that operates asynchronously with and separately from the processing of the original program. The housekeeping processing includes processing of instructions to execute GC and instructions to execute JIT compiling, for example. The "instructions to cause a delay in execution of instructions to be executed by exclusively using an external resource" is executed in a thread different from a thread in which the instructions to be executed by exclusively using an external resource is executed.

In the embodiment of the invention, "instructions to shorten execution time of instructions to be executed by exclusively using an external resource" is instructions that shorten the execution time of the instructions to be executed by exclusively using an external resource, if executed before execution of the instructions to be executed by exclusively using an external resource. The instructions to shorten execution time of instructions to be executed by exclusively using an external resource are, for example, instructions to execute JIT compiling. These instructions are executed in the thread.

In the embodiment of the invention, "counters respectively associated with the threads" are values each indicating "how quickly the thread needs to execute instructions therein." Here, "how quickly the thread needs to execute instructions therein" means that the thread intends to execute, without delay, the instructions to be executed in the thread. The larger the value of the counter, the "more quickly" the thread needs to execute the instructions.

In the embodiment of the invention, in order to avoid as much interruption of execution of instructions in a thread having a large value of the counter as possible, the execution sequence of instructions is controlled by use of methods A to E below. Note that the specific descriptions of the respective methods A to E will be provided below.

A. In a state in which the sum of the values of the counters is large, the execution sequence is controlled so that the instructions to cause a delay cannot be executed as practicably as possible.

B. In a state in which the sum of the values of the counters is large, the priority of the instructions to cause a delay is lowered, so that execution of the instructions to cause a delay is suppressed.

C. The priority of processing to be executed in a thread having a large value of the counter is increased.

D. For a method executed in a thread having a large value of the counter, the instructions to shorten the execution time is executed sooner, so that the processing of the method is made faster.

E. In a case where a value of the counter is increased, execution of the instructions to cause a delay is moved up.

The value of the counter can be also increased or decreased by an application. However, an increase or decrease in the value of the counter is typically executed by a method in a system library of the program execution environment. For example, in a case where the external resource is a database, the counter is increased in a method of acquiring the lock of a database record in a library in order to access the database. Furthermore, the counter is decreased in a method of releasing the lock. For example, the computer system adds 1 to the value of the counter when "select for update," which is an SQL instruction to lock a database record, is executed. Moreover, the computer system subtracts 1 from the value of the counter when a commit instruction (commit) to release the lock of the record is executed. In this manner, execution of the instructions to cause a delay is suppressed when a large number of database records are locked so that the duration for acquiring the lock can be shortened.

The administrator may set the incremental/decremental value of the counter in accordance with the target to be locked. The administrator is allowed to provide a discretization score to the incremental/decremental value of the counter.

Suppose that the external resource is a hard disk, for example, and the targets to be locked are a file on the hard disk, a folder A in which the file is stored and a folder B in which the file is stored. Here, suppose that the file has a low access frequency, and has a low possibility of causing a delay in the processing of the entire system even when the file is locked. Furthermore, suppose that the folder A has a high access frequency, and a high possibility of causing a delay in the processing of the entire system when the file is locked, as compared with that of the file. In addition, suppose that the folder B has a higher access frequency than that of the folder A, and a high possibility of causing a delay in the processing of the entire system when the file is locked, as compared with that of the folder A. In this case, the administrator may set 1, 5 and 10 for the incremental/decremental values for the locks of the file, the folder A and the folder B, respectively.

Moreover, suppose that the external resource is a database, for example, and the targets to be locked are a record, a table A and a table B in the database. Here, suppose that the record has a low possibility of causing a delay of the processing of the entire system even when the record is locked. Furthermore, suppose that the table A has a high possibility of causing a delay in the processing of the entire system when the table A is locked, as compared with that of the record. In addition, suppose that the table B has a higher possibility of causing a delay in the processing of the entire system when the table B is locked, as compared with that of the table A. In this case, the administrator may set 1, 5 and 10 for the incremental/decremental values of the locks for the record, the table A and the table B, respectively.

In addition, suppose that the external resource is a spreadsheet or a book file, and the targets to be locked are a cell in the spreadsheet, a cell, a sheet and a book in the book file. The data handled in the cell, the sheet and the book is usually less in the order of the cell, the sheet and the book. Accordingly, the administrator may set 1, 5 and 10 for the incremental/decremental values of the locks for the cell, the sheet and the book, respectively.

With the setting of the incremental/decremental values by the administrator, execution of the instructions to cause a delay can be suppressed in accordance with the degree of the influence of the lock.

"GC" is a function to automatically release an area that is no longer necessary from a memory area dynamically allocated by a program. GC is executed when the memory size usable for memory allocation decreases to a value less than a predetermined threshold.

In the embodiment of the present invention, the threshold is adjusted in accordance with the values of the counters.

In the embodiment of the invention, the "memory size usable for memory allocation performed during execution of a program" is an upper limit value of the memory size allocatable at the time when a memory area is allocated in a case where the memory area is dynamically allocated during the execution of the program.

"JIT compiling" is processing to convert program codes into a program in machine language at the time of execution of the program. The conversion is performed in units of a method.

The program execution environment having a JIT compiling function is generally provided with a number-of-execution-times counter for each method. Upon execution of the method under an interpreter, 1 is added to the number-of-execution-times counter. Then, when the number of execution times exceeds a previously set threshold, the method is registered in a list in which a target method for JIT compiling is registered. JIT compiling is periodically executed. Upon execution of JIT compiling, the method registered in the list is converted into machine language codes. In addition, the administrator can set an optimization level for JIT compiling. The higher the optimization level is set, the longer the duration required for the conversion and the shorter the execution time of the converted machine language codes.

The JIT compiling processing itself is instructions to cause the delay. However, the processing time for the compiled method becomes shorter. Accordingly, the JIT compiling processing is also the instructions to achieve the shortening of execution time.

Furthermore, in the embodiment of the invention, the unit of the amount of increase for the number-of-execution-times counter is not limited to 1. In the embodiment of the invention, the value of the counter in association with each of the threads is added to the amount of increase as a "weight." For example, if the value of the counter is 5, the amount of increase is 6 (1+5=6).

In the embodiment of the invention, a "priority of a thread" refers to information assigned to each of threads and used for determining the execution order of instructions to be executed in the threads. If multiple threads having different priorities are in a state to be executed, the instructions are executed from the one included in a thread with higher priority.

Hereinafter, the embodiment of the invention will be described with reference to drawings. It should be noted that the embodiment is intended only to illustrate an exemplary mode of the invention and is not intended to limit the scope of the invention to those described in the embodiment. In addition, in the accompanying drawings, the same components are denoted by the same reference numerals unless specifically noted otherwise.

Figure 1:
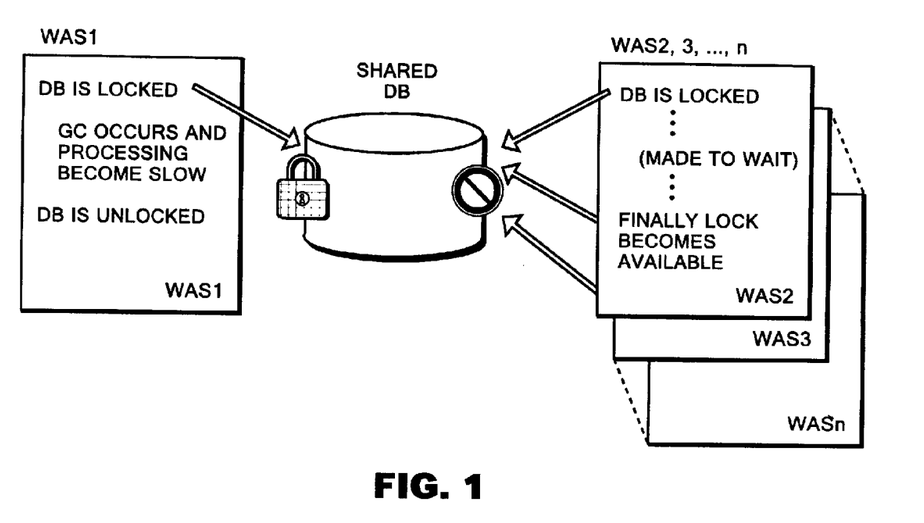
FIG. 1 shows an example in which processing time of a system is delayed due to the occurrence of GC during the acquisition of a lock in prior art.

FIG. 1 shows an example of a case where processing time of a system delays due to the occurrence of GC during the lock acquisition in a prior art.

The shared DB is a database including records exclusively accessible by multiple servers (WAS 1, 2, . . . to n). Moreover, processing time of an application becomes longer in a case where GC occurs in the server as compared with a case where GG does not occur.

Here, suppose that GC occurs after an application on the WAS 1 acquires the lock of the database before releasing a lock of the database. Then, the processing time of the application is delayed. Accordingly, the duration for the acquisition of the lock of the database becomes longer. Then, during the acquisition of the lock, other servers (WAS 2, 3, . . . to n) cannot acquire the lock of the database server. In order for the other servers to acquire the lock, it is necessary to wait until the GC on the WAS 1 is completed, and the lock is released. For this reason, the processing time of the entire system is delayed.

Figure 2:
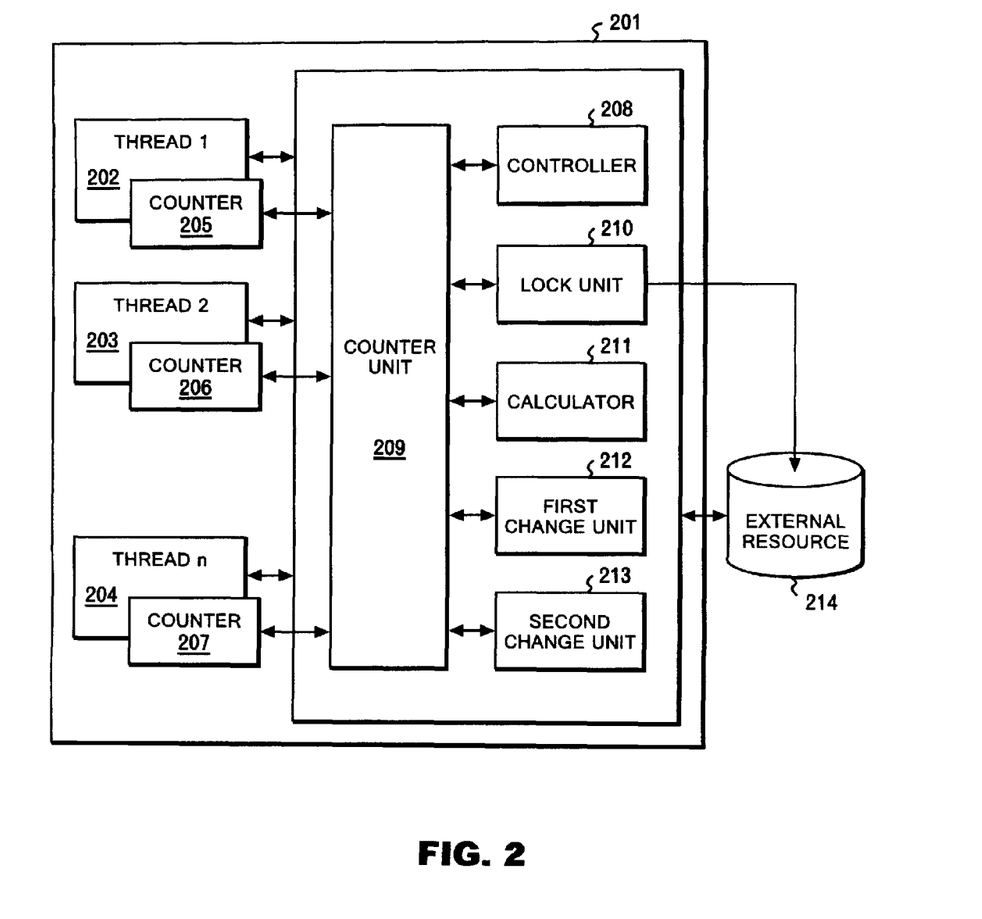
FIG. 2 shows an example of a system configuration in an embodiment of the invention.

FIG. 2 shows an example of a system configuration according to the embodiment of the invention.

A computer program execution environment (201) includes threads (202 to 204), a controller (208), a counter unit (209), a lock unit (210), a calculator (211), a first change unit (212) and a second change unit (213). In addition, the threads (202 to 204) are associated with counters (205 to 207), respectively. The counter unit (209) retains the sum of the values of the counters. Alternatively, instead of associating the threads (202 to 204) with the counters (205 to 207), respectively, the counter (209) may retain only the sum of the values of the counters.

In a case where an external resource (214) is exclusively used, instructions are executed in an applicable one of the threads (202 to 204) while exclusively using the external resource (214).

The lock unit (210) executes the instruction to acquire a lock of the external resource (214) so as to use the external resource (214) exclusively.

In accordance with the execution of the instruction to acquire the lock, the counter (209) increases or decreases the value of a corresponding one of the counters (205 to 207) associated with the threads (202 to 204), the corresponding one of the counters (205 to 207) being associated with the one of the threads (202 to 204) in which the instructions exclusively using the external resource (214) is executed. In accordance with the increase or decrease in the value of the corresponding one of the counters (205 to 207), the counter unit (209) increases or decreases the sum of the values of the counters. For example, when the instruction to acquire the lock is executed in the thread (202), the counter unit 209 increases the value of the counter (205) by 1. Along with the increase in the value of the counter (205), the counter unit (209) increases the sum of the values of the counters (205 to 207) by 1. Alternatively, the counter unit (209) may increase or decrease the sum of the values of the counters in accordance with the execution of the instruction to acquire the lock. For example, in a case where the instruction to acquire the lock is executed in the thread (202), the counter unit (209) increases the sum of the values of the counters by 1.

In a case where the exclusive use of the external resource (214) is terminated, the lock unit (210) executes an instruction to release the external resource (214) from the exclusive use. In accordance with the execution of the release instruction, the counter unit (209) increases or decreases the value of a corresponding one of the counters (205 to 207) associated with the threads (202 to 204), the corresponding one of the counters (205 to 207) being associated with the one of the threads (202 to 204) in which the instructions exclusively using the external resource (214) are executed. In accordance with the increase or decrease in the value of the corresponding one of the threads (205 to 207), the counter unit (209) increases or decreases the sum of the values of the counters. For example, when the release instruction is executed in the thread (202), the counter unit (209) decreases the value of the counter (205) by 1. Along with the decrease in the value of the counter (205), the counter unit (209) decreases the sum of the values of the counters (205 to 207) by 1. Alternatively, the counter unit (209) may increase or decrease the sum of the values of the counters in accordance with execution of the release instruction. For example, in a case where the release instruction is executed in the thread (202), the counter unit (209) decreases the sum of the values of the counters by 1.

In accordance with the increase or decrease in the sum of the values of the counters (205 to 207), the first change unit (212) changes a priority of a thread (not shown) in which instructions that cause a delay in execution time of the instructions to be executed by exclusively using an external resource are executed.

In accordance with the increase or decrease in the value of a corresponding one of the counters (205 to 207), the second change unit (213) changes the priority of a corresponding one of the threads (202 to 204).

In accordance with the value of a corresponding one of the counters (205 to 207), or a change in the value thereof, the controller (208) changes the execution order of instructions included in the corresponding one of the threads (202 to 204). The instructions include instructions to be executed by exclusively using an external resource and instructions that cause a delay in the execution time of the instructions to be executed by exclusively using an external resource.

In accordance with execution of a method in the thread, the calculator (211) obtains the value of the number-of-execution-times counter. The amount of increase in the number-of-execution-times counter is the value obtained by adding the value of the counter to the amount of increase in the number-of-execution-times counter as the weight.

In accordance with the value of the number-of-execution-times counter, the controller (208) also executes instructions to shorten the execution time of the instructions to be executed by exclusively using an external resource.

Hereinafter, the embodiment of the invention will be described citing a case where the computer program execution environment is a JAVA (processing system as an example.

Figure 3:
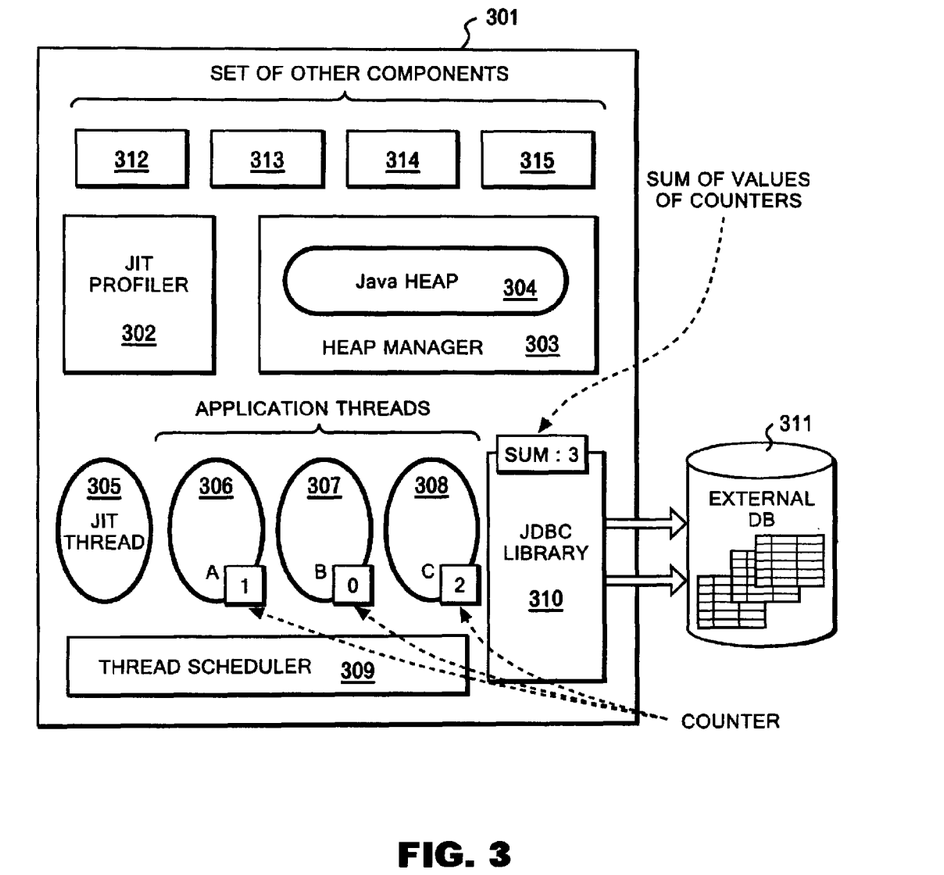
FIG. 3 shows an example of a configuration of a JAVA processing system in the embodiment of the invention.

FIG. 3 shows an example of a configuration of the JAVA processing system in the embodiment of the invention. Application threads (306 to 308) are threads in which applications are executed. Each of the application threads (306 to 308) retains a "counter." The application threads (306 to 308) are respectively associated with the counters. In addition, the sum of the values of the counters is retained in a JDBC library (310). Note that the counters and the sum of the values of the counters may be retained in any place of a target in which a program can be incorporated. For example, the counters and the sum of the values of the counters may be retained in a thread scheduler (309). Alternatively, it is also possible that only the sum of the values of the counters is retained in the JDBC library (310) while the threads do not retain the respective counters.

A JIT thread (305) is a thread in which JIT compiling processing is executed. A JIT profiler (302) monitors execution of a method in the application threads (306 to 308) and is a profiler for controlling the timing of the JIT compiling.

The JIT profiler (302) takes the values of the counters associated with the threads into consideration when profiling the method. The JIT profiler (302) adds a weight to a conventional counter for the number of method execution times in order that a method called by a thread having a large value of the counter can be complied earlier. The JIT profiler (302) corresponds to the calculator (211) in FIG. 2 and the controller (208) in FIG. 2.

A JAVA heap (304) is a memory area usable in JAVA. A heap manager (303) is a structure for managing the memory area and executes object creation processing and GC. The heap manager (303) adjusts the timing of GC on the basis of the sum of the values of the counters. In a case where the sum of the values of the counters is small, the heap manager (303) starts GC even if there is a margin in the heap. In a case where the sum of the values of the counters is large, the heap manager (303) suppresses execution of GC until the amount of an available area in the heap decreases to an extremely small value. The heap manager (303) corresponds to the controller (208).

The thread scheduler (309) is a scheduler for controlling the execution order of the application threads (306 to 308) and the JIT thread (305). The thread scheduler (309) adjusts the priority of the JIT thread on the basis of the sum of the values of the counters. In a case where the sum of the values of the counters is large, the thread scheduler (309) suppresses JIT compiling processing by decreasing the priority of the JIT thread (305). In a case where the sum of the values of the counters is small, the thread scheduler (309) increases the priority of the JIT thread, so that the JIT compiling processing can be started more often.

The thread scheduler (309) also performs thread scheduling while taking the values of the counters associated with the threads into consideration. The thread scheduler (309) preferentially executes a thread having a large value of the counter over a thread having a small value of the counter. The first scheduler (309) corresponds to the controller (208), the first change unit (212) in FIG. 2 and the second change unit (213) in FIG. 2.

A set of other components (312 to 315) is a group of components that provide various functions to the computer system. For example, the components include an interpreter and a class loader.

In the example of FIG. 3, an external database (hereinafter, referred to as a DB) (311) is used as the external resource. Here, the JDBC library (310) is a library for providing various functions to a JAVA program to access the DB (311). The JDBC library (310) corresponds to the counter unit (209) in FIG. 2 and the lock unit (210) in FIG. 2.

Each of the values of the counters or of the sum of the value of the counters is increased or decreased by a method in the JDBC library (310).

Figure 4A:
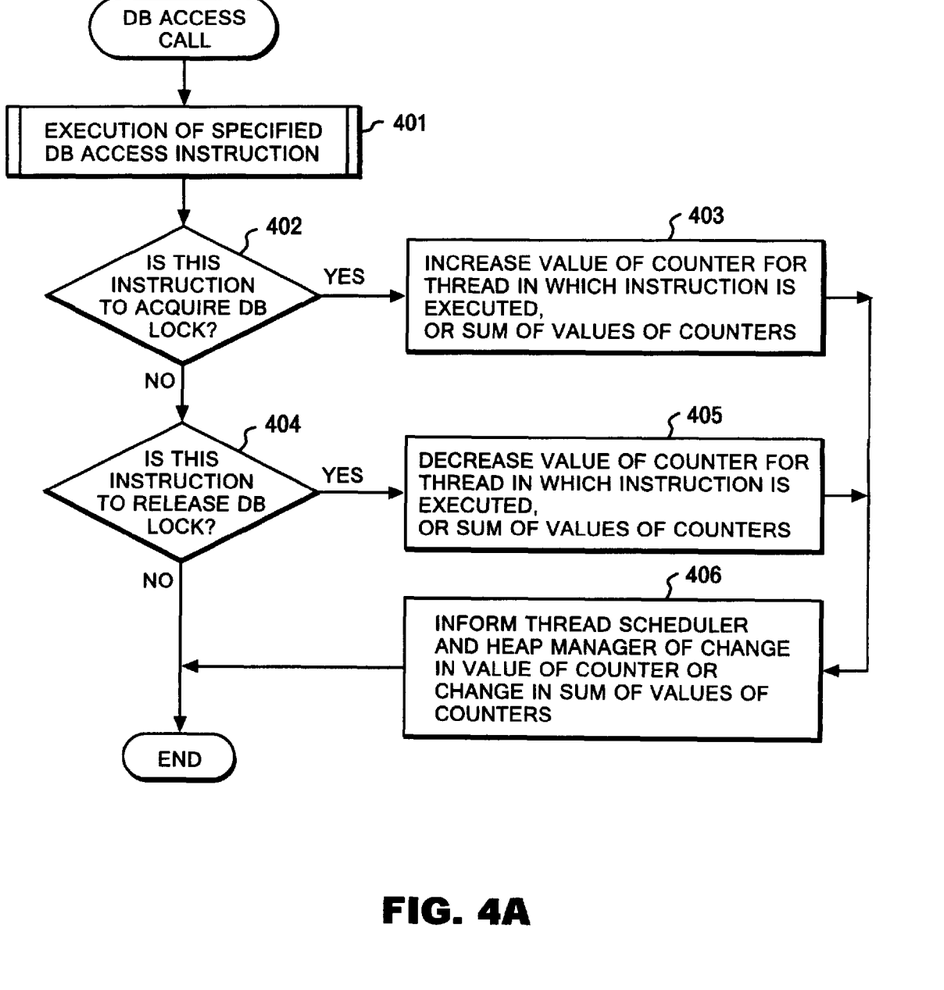
FIG. 4A shows an operation flow of a method of a JDBC (Java DataBase Connectivity) library in the embodiment of the invention.

FIG. 4A shows an operation flow of the method of the JDBC library (310) in FIG. 3, in the embodiment of the invention. Here, the target to be locked is assumed to be a record of the DB (311) in FIG. 3.

In step 401, when the method of the JDBC library (310) is called, in a corresponding one of the application threads (306 to 308 in FIG. 3), the computer system executes a DB access instruction specified by the method.

In step 402, the computer system determines if the DB access instruction is an instruction to acquire the lock of a record in the DB (311). In a case where the DB access instruction is an instruction to acquire the lock of a record in the DB (311), the operation proceeds to step 403. In step 403, the computer system increases the value of the counter associated with the thread in which the DB access instruction is executed or the sum of the values of the counters. The sum of the values of the counters increases in accordance with the amount of the increase. Furthermore, the computer system informs the heap manager (303) in FIG. 3 and the thread scheduler (309) in FIG. 3 that the value of the counter or the sum of the values of the counters has been changed (step 406).

In step 404, the computer system determines if the DB access instruction is an instruction to release the lock of the record in the DB (311). In a case where the DB access instruction is the instruction to release the lock of the record in the DB (311), the operation proceeds to step 405. In step 405, the computer system decreases the value of the counter associated with the thread in which the DB access instruction is executed or the sum of the values of the counters. The sum of the values of the counters decreases in accordance with the amount of the decrease.

In step 406, the computer system informs the heap manager (303 in FIG. 3) and the thread scheduler (309 in FIG. 3) that the value of the counter or the sum of the values of the counters has been changed.

The administrator may change the incremental/decremental value of the counter in accordance with the influence on processes other than the thread having acquired the lock. For example, the incremental/decremental value of the counter is changed in accordance with the degree of a risk of interrupting the processing of another server. For example, the administrator may change the incremental/decremental value of the counter depending on the amount of the influence of the lock. To be specific, the administrator may use the incremental/decremental value of ±1 for the lock of a record, ±5 for the lock of a table having a larger influence than that of a record (in other words, processing that needs to be performed soon). Alternatively, another conceivable method is to receive a value for incrementing and decrementing the value of the counter (the amount of influence on another server) as a return value of a processing request to the DB (311), and then to increase or decrease the value of the counter on the basis of the value.

Figure 4B:
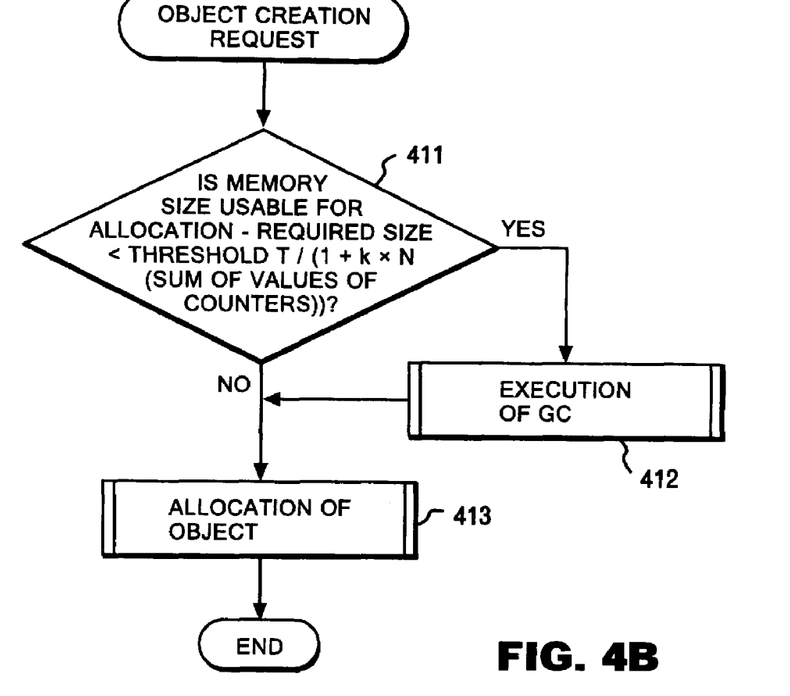
FIG. 4B shows an operation flow of processing that requires memory allocation, that is, an operation flow of processing to be performed in a case where object creation is requested, in the embodiment of the invention.
Figure 4C:
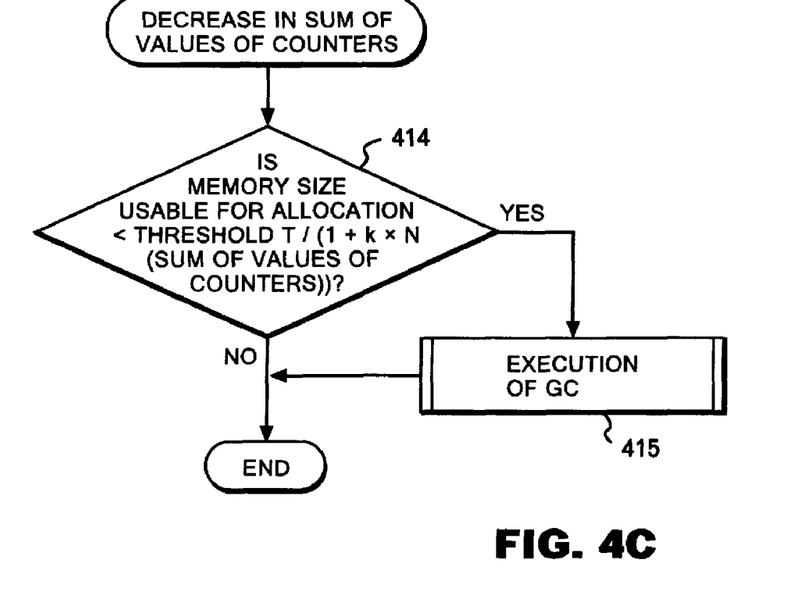
FIG. 4C shows an operation flow of processing executed by the computer system in a case where the sum of values of counters decreases in the embodiment of the invention.

FIGS. 4B and 4C show operation flows of the heap manager in the embodiment of the invention.

The operation flows shown in FIGS. 4B and 4C correspond to the method in FIG. 4A.

FIG. 4B shows an operation flow of processing that requires memory allocation, that is, an operation flow of processing to be performed in a case where object creation is requested.

In step 411, upon request of object creation, the computer system determines by use of the heap manager (303) whether or not to execute GC. The determination method will be separately described later. In a case where execution of GC is determined to be necessary, as a result of the determination, the operation proceeds to step 412.

In step 412, the computer system executes GC. Then, the operation proceeds to step 413.

In a case where execution of GC is determined to be not necessary, as a result of the determination, the operation proceeds to step 413.

In step 413, the computer system allocates memory for the object.

FIG. 4C shows an operation flow of processing executed by the computer system in a case where the sum of the values of the counters decreases in the case of the embodiment of the invention.

In step 414, in a case where the sum of the values of the counters decreases, the computer system determines by use of the heap manager (303) whether or not to execute GC. The determination method will be separately described later. When execution of GC is determined to be necessary, as a result of the determination, the operation proceeds to step 415.

In step 415, the computer system executes GC.

The computer system executes GC at the time when a memory size usable for normal memory allocation decreases to a value less than a threshold T. In the embodiment of the invention, the computer system adjusts the threshold by use of the values of the counters. A formula used for the adjustment of the threshold will be shown below.

$$T/(1+k \times N),$$

where

T is a threshold of a memory size that used when the external resource is not exclusively used, and that starts the instructions that cause a delay in the execution time of the instructions to be executed by exclusively using the external resource, N is the sum of the values of the counters, and k is a parameter for adjusting the value to be obtained on the basis of the sum of the values of the counters.

The larger the value of k, the larger the threshold value is to be adjusted. The administrator or the computer system sets the value of k. In a case where the administrator sets the value of k, the administrator sets k to 0.1, for example. In a case where the computer system automatically sets k, the computer system may use a method to monitor frequency of GC and then to set a smaller value for k when the frequency of CG is too high.

The computer system determines whether or not to execute GC by comparing the value obtained in accordance with the formula with the memory size usable for memory allocation. Note that in the example shown in FIG. 4B, the actual memory size usable for memory allocation is the value obtained by subtracting the memory size allocated for the object from the memory size usable for memory allocation. The computer system executes GC in a case where the memory size usable for memory allocation is less than the value obtained in accordance with the formula. Specifically, in a case where the sum of the values of the counters is small, GC is executed even if there is a margin in the heap memory. In this manner, the possibility that GC is executed in a state where the sum of the values of the counters is large is reduced.

Figure 4D:
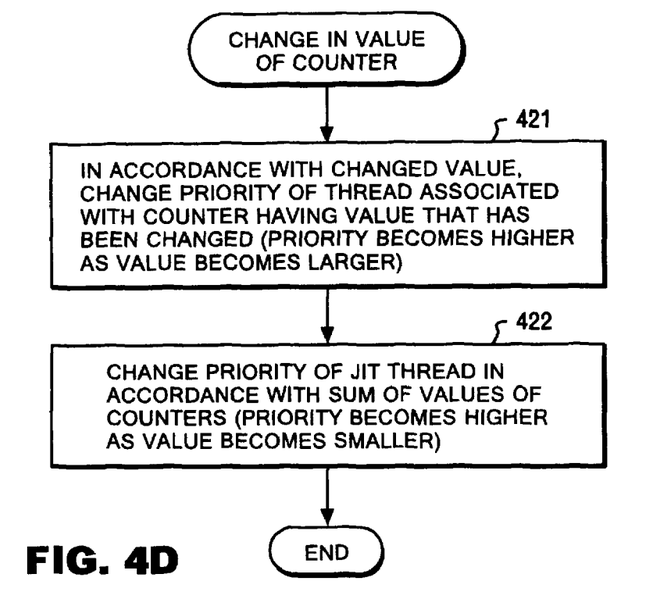
FIG. 4D shows an operation flow of a thread scheduler in the embodiment of the invention.

FIG. 4D shows an operation flow of the thread scheduler (309) in the embodiment of the invention.

An operation flow shown in FIG. 4D corresponds to the methods in FIGS. 4B and 4C.

The operation flow shown in FIG. 4D is executed by the computer system in a case where there is a change in the values of the counters.

In step 421, in response to a change in a corresponding one of the values of the counter, the computer system changes, by use of the thread scheduler (309), in accordance with the value of the counter, the priority of the thread whose value of the counter is changed. The computer system sets the priority of the thread in a manner that the larger the value of the counter, the more preferentially the thread is executed.

In step 422, in accordance with the sum of the values of the counters, the computer system changes the priority of the thread (305) in FIG. 3 in which JIT compiling is executed (hereinafter, referred to as a JIT thread). The JIT thread (305) is executed in a manner that the smaller the sum of the values of the counters, the more preferentially, the JIT thread (305) is executed.

In other words, in a case where the sum of the values of the counters is large, execution of JIT compiling is suppressed. Accordingly, execution of a thread having a large value of the counter is less likely interrupted.

Figure 4E:
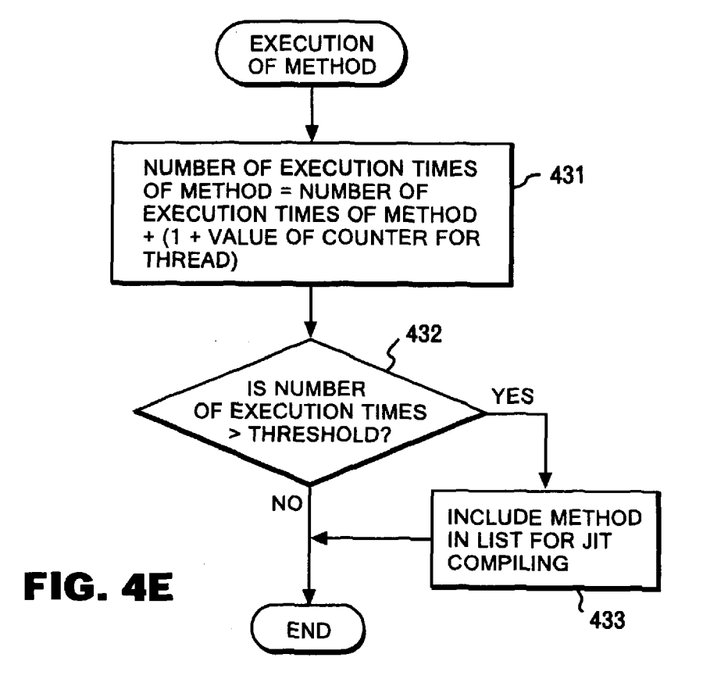
FIG. 4E shows an operation flow of a JIT profiler in the embodiment of the invention.

FIG. 4E shows an operation flow of the JIT profiler (302) in FIG. 3 in the embodiment of the invention.

The operation flow shown in FIG. 4E corresponds to the method in FIG. 4D.

In a JAVA processing system, a number-of-execution-times counter is generally prepared for each method. The number-of-execution-times counter is increased by 1 each time the method is executed under an interpreter. Then, a JAVA processing system typically employs a configuration in which JIT compiling is executed when the value of the number of execution times exceeds a threshold. The threshold is a value that can be set by the administrator in the JAVA processing system.

In step 431, in response to execution of a method in the thread, the computer system adds 1 to the number-of-execution-times counter prepared for the method. Moreover, the computer system adds the value of the counter associated with the thread in which the method is executed to the number-of-execution-times counter. Because of the addition of the value, a method executed in a state of "sooner" is controlled so that JIT compiling for the method can be performed sooner.

In step 432, the computer system compares the value of the number-of-execution-times counter to which the value of the counter has been added with the threshold. In a case where the value of the number-of-execution-times counter is larger than the threshold, the operation proceeds to step 433.

In step 433, the computer system registers the method in the list of methods to be subjected to JIT compiling.

Because of the operation flow, a method executed during the lock is compiled sooner. Accordingly, the processing of the method to be executed next time and later is expected to be faster.

Furthermore, the optimization level for compiling may be set higher for a method having a higher number of execution times.

Figure 4F:
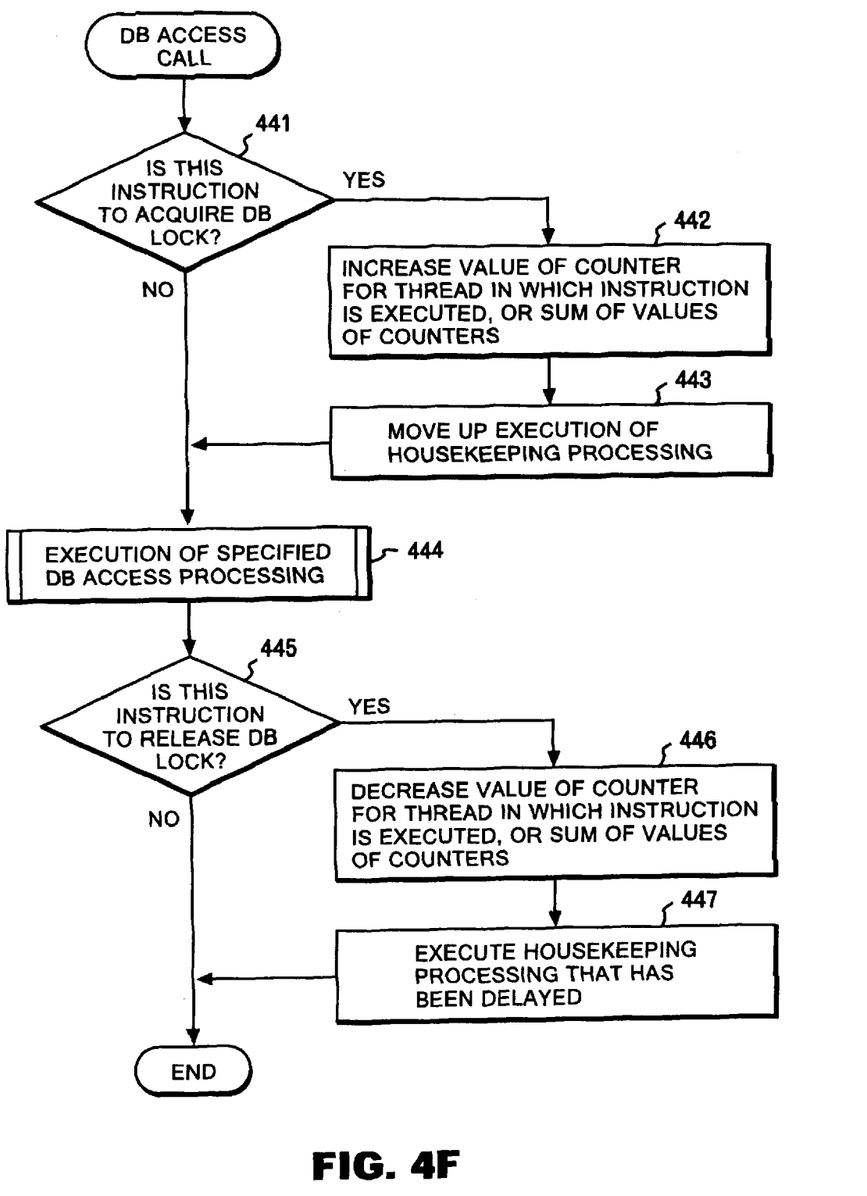
FIG. 4F shows an extended operation flow of the JDBC library in the embodiment of the invention.

FIG. 4F shows an extended operation flow of the JDBC library (310) in the embodiment of the invention.

The operation flow shown in FIG. 4F corresponds to the method in FIG. 4E.

The operation flow shown in FIG. 4F is executed by the computer system in a case where an instruction to access the DB (311) is called.

In step 441, in accordance with the event that an instruction to access the DB (311) is called the computer system determines whether or not the instruction is an instruction to acquire the lock of the DB (311), in a JDBC driver. In a case where the instruction is the instruction to acquire the lock of the DB (311), the operation proceeds to step 442. On the other hand, in a case where the instruction is not the instruction to acquire the lock of the DB (311), the operation proceeds to step 444.

In step 442, before the actual acquisition of the lock, the computer system increases the value of the counter associated with the thread in which the instruction is executed or the sum of the values of the counters. In accordance with the amount of the increase, the sum of the values of the counters increases.

In step 443, the computer system executes housekeeping processing such as GC or JIT compiling processing for the methods to be compiled, which are accumulated in the list. In addition, in a case where a method executed during the acquisition of the lock can be determined, the computer system performs JIT compiling for the method. Because of this JIT compiling for the method, it is made possible to reduce a risk that the lock period becomes longer due to the occurrence of GC or JIT compiling processing after the acquisition of the lock.

In step 444, the computer system executes the instruction to access the specified DB (311).

In step 445, the computer system determines whether or not the instruction to access the DB (311) is an instruction to releases the lock of the DB (311). In a case where the instruction to access the DB (311) is the instruction to release the lock of the DB (311), the operation proceeds to step 446. On the other hand, in a case where the instruction to access the DB (311) is not the instruction to release the lock of the DB (311), the operation ends.

In step 446, the computer system decreases the value of the counter associated with the thread in which the instruction to access the DB (311) is executed, or the sum of the values of the counters. In accordance with the amount of the decrease, the sum of the values of the counters decreases.

In step 447, the computer system performs housekeeping processing that has been delayed, such as GC or JIT compiling processing. Furthermore, in a case where a method executed during the acquisition of the lock can be determined, the computer system can explicitly perform JIT compiling in order to execute the method faster when the method is executed next time.

Figure 5:
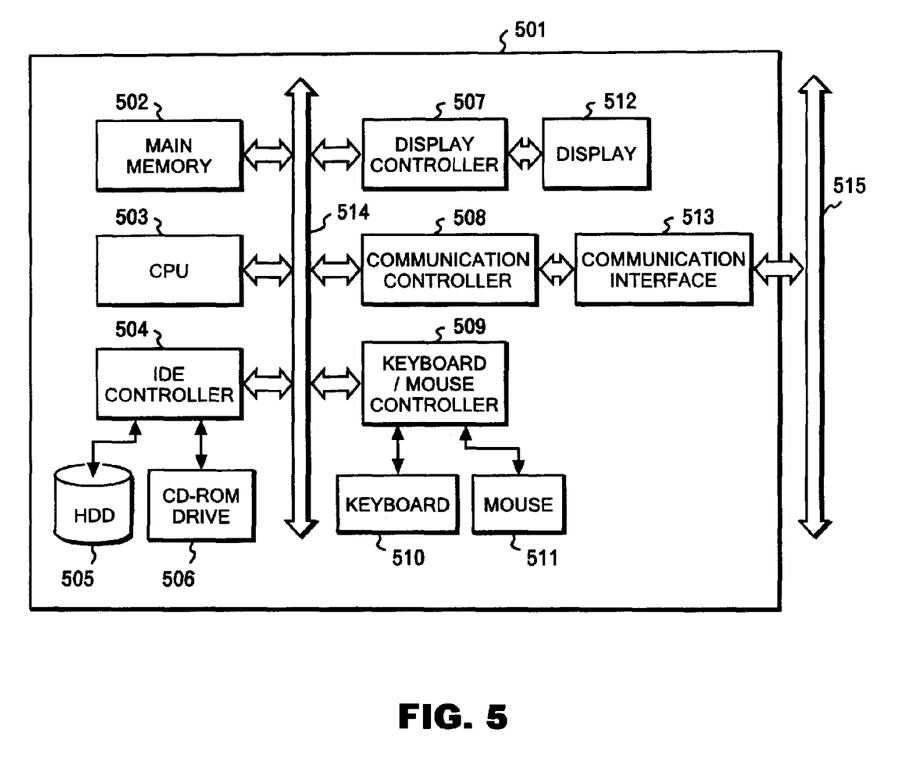
FIG. 5 shows a block diagram of computer hardware in the embodiment of the invention.

FIG. 5 shows a block diagram of computer hardware according to the embodiment of the invention.

The computer system (501) includes a CPU (503) and a main memory (502). The CPU (503) and the main memory (502) are each connected to a bus (514). The CPU (503) is preferably a CPU based on a 32-bit architecture or a 64-bit architecture. A display (512) such as an LCD monitor is connected to the bus (514) via a display controller (507). The display (512) is used to display, by using an appropriate graphic interface, information on the computer system for managing the computer system connected to a network via a communication line, and information on software running on the computer system. In addition, a hard disk or silicon disk (505), and a CD-ROM, DVD or Blue-ray disk drive (BD) (506) are also connected to the bus (514) via an IDE or SATA controller (504).

In the hard disk (505), an operating system, a program such as J2EE™, which provides a Java execution environment, other programs and data are stored in a form loadable into the main memory.

The CD-ROM, DVD or BD drive (506) is used for additionally installing a program from a CD-ROM, DVD or BD into the hard disk when needed. A keyboard (510) and a mouse (511) are also connected to the bus (514) via a keyboard/mouse controller (509).

A communication interface (513) complies with an Ethernet (trademark) protocol, for example. The communication interface (513) is connected to the bus (514) through a communication controller (508). The communication interface (513) serves to physically connect the computer system and a communication line (515) to each other, and provides a network interface layer to a TCP/IP communication protocol of a communication function of an operating system for the computer. In an exemplary manner, the communication line may be configured as a wired LAN environment, or a wireless LAN environment based on a wireless LAN connection standard such as IEEE802.11a/b/g/n.

According to the aspects of the invention, in a case where a thread in which an application on a JAVA processing system, for example, is executed keeps a large number of locks of external resources, execution of housekeeping processing such as GC or JIT compiling is suppressed. In addition, the processing of the thread holding the locks is preferentially performed. Accordingly, it is possible to prevent the lock from being kept for a long time. Thus, the risk of degradation in the performance of the entire system is reduced, the degradation resulting from the occurrence of a situation where an application to use the external resource, on a different server, is made to wait for acquiring the same lock.

Although the embodiments of the invention have been described in detail, it should be understood that various changes, substitutions and alternations can be made therein without departing from spirit and scope of the inventions as defined by the appended claims.

What is claimed is:

1. A computer system for preventing a delay in execution time of one or more instructions in one or more threads executed by exclusively using an external resource, the computer system comprising:
   a lock unit adapted to execute an instruction, wherein the instruction is at least one selected from a set comprising an instruction to acquire exclusive-use of the external resource and an instruction to release the exclusive-use of the external resource;
   a counter unit adapted to performing at least one of increasing or decreasing, in accordance with the execution of at least one instruction of the lock unit, a value of a counter associated with the at least one thread; and
   a controller adapted to control, in accordance with at least one selected from the value of the counter and a change in the value of the counter, an execution order of the one or more instructions and instructions that cause a delay in the execution time, wherein a computer program execution environment includes the external resource;
   wherein the controller is adapted to execute the instructions that cause a delay where, a memory size usable for memory allocation to be performed during execution of a program is smaller than a value obtained on the basis of a sum of values of counters;
   wherein the value obtained on the basis of the sum of the values of the counters is calculated in accordance with a formula: T/(1+k×N), where
   T is a threshold of a memory size that is used when the external resource is not exclusively used, and is the threshold of a memory size that starts the instructions that cause a delay;
   k is a parameter for adjusting the value to be obtained on the basis of the sum of the values of the counters; and
   N is the sum of the values of the counters.

2. The computer system of claim 1, further comprising:
   a first change unit adapted to change, in accordance with at least one of an increase or decrease in the sum of the values of the counters, a priority of the thread having the instructions that cause a delay.

3. The computer system of claim 2, wherein if the sum of the values of the counters is large,
   the first change unit is further adapted to provide a low priority to the thread having the instructions that cause a delay; and
   the controller is further adapted to execute the one or more instructions in the one or more threads, in descending order of the priorities of the one or more threads.

4. The computer system of claim 1, further comprising:
a second change unit adapted to change, in accordance with an increase or decrease in each of the counters, a priority of the thread in association with the counter.

5. The computer system of claim 4, wherein:
the second change unit is further adapted to provide a high priority to the thread in association with the counter having a large value; and
the controller is further adapted to execute the one or more instructions included in the one or more threads, in descending order of the priorities of the one or more threads.

6. The computer system of claim 1, wherein the controller is further adapted to:
provide the value of the counter in association with the thread, having a method, is executed, where a value of a number-of-execution-times counter provided for the method is increased.

7. The computer system of claim 6, further comprising:
a calculator adapted to obtain the value of the number-of-execution-times counter; and
if the value of the number-of-execution-times counter is larger than a threshold, the controller is further adapted to execute instructions to shorten the execution time of the one or more instructions, for each of the methods respectively associated with the one or more threads.

8. The computer system according to claim 7,
wherein the instructions to shorten the execution time of the instructions are instructions that execute just in time (JIT) compiling; and
if the value of the number-of-execution-times counter is larger than the threshold, the controller is further adapted to add the method in association with the number-of-execution-times counter to a list of methods to be subjected to JIT compiling.

9. The computer system of claim 1, wherein,
the counter unit is further adapted to increase the value of a corresponding one of the counters before acquisition of the exclusive-use of the external resource, in response to the execution of the instruction to acquire the exclusive-use of the external resource; and
in accordance with the increase in the value of the counter, the controller is further adapted to execute, before the acquisition of the exclusive-use of the external resource, the instructions that cause a delay.

10. The computer system of claim 1, wherein the counter unit is adapted to decrease the value of a corresponding one of the counters after release of the exclusive-use of the external resource, in response to the execution of the instruction to release the exclusive-use of the external resource; and
in accordance with the decrease in the value of the counter, the controller is further adapted to execute the instructions that cause a delay.

11. The computer system of claim 1, wherein the counter unit is further adapted to:
increase the value of a corresponding one of the counters in accordance with the execution of the instruction to acquire the exclusive-use of the external resource; and
decrease the value of a corresponding one of the counters in accordance with the execution of the instruction to release the exclusive-use of the external resource.

12. The computer system of claim 1, wherein the computer program execution environment is a JAVA processing system.

13. The computer system according to claim 1, wherein the external resource includes a database, and the exclusive-use of the external resource includes exclusive-use of the database resource.

14. The computer system of claim 1, wherein the instructions that cause a delay are selected from a set comprising instructions to execute garbage collection and instructions to execute just in time (JIT) compiling.

15. A computer system for preventing a delay in execution time of one or more instructions in one or more threads executed by exclusively using an external resource, the computer system comprising:
a lock unit adapted to execute an instruction in one or more threads, wherein the instruction is at least one selected from a set comprising an instruction to acquire exclusive-use of the external resource and an instruction to release the exclusive-use of the external resource;
a counter unit adapted to perform at least one of increasing or decreasing, in accordance with execution of at least one instruction executed by the lock unit, a sum of values of counters of all the threads; and
a controller adapted to control, in accordance with the sum of the values of the counters or a change in the sum of the values of the counters, an execution order of the one or more instructions and instructions that cause a delay in the execution time of the one or more instructions to be executed by exclusively using the external resource, wherein a computer program execution environment includes the external resource;
wherein the controller is adapted to execute the instructions that cause a delay where, a memory size usable for memory allocation to be performed during execution of a program is smaller than a value obtained on the basis of the sum of the values of the counters;
wherein the value obtained on the basis of the sum of the values of the counters is calculated in accordance with a formula: $T/(1+k \times N)$, where
T is a threshold of a memory size that is used when the external resource is not exclusively used, and is the threshold of a memory size that starts the instructions that cause a delay;
k is a parameter for adjusting the value to be obtained on the basis of the sum of the values of the counters; and
N is the sum of the values of the counters.

16. A method for preventing a delay in execution time of one or more instructions in one or more threads executed by exclusively using an external resource in a computer program execution environment, the method comprising the steps of:
executing at least one instruction in one or more threads, the at least one instruction selected from a set comprising an instruction to acquire exclusive-use of the external resource and an instruction to release the exclusive-use of the external resource;
performing at least one of increasing or decreasing, in accordance with execution of at least one of the instruction to acquire exclusive-use of the external resource or the instruction to release the exclusive-use of the external resource, a value of a corresponding one of counters associated with the thread; and
controlling, in accordance with the value of the counter or a change in the value of the counter, an execution order of the one or more instructions to be executed by exclusively using the external resource and instructions that cause a delay;
wherein the controlling is adapted to execute the instructions that cause a delay where, a memory size usable for memory allocation to be performed during execution of a program is smaller than a value obtained on the basis of a sum of values of counters;

wherein the value obtained on the basis of the sum of the values of the counters is calculated in accordance with a formula: $T/(1+k \times N)$, where T is a threshold of a memory size that is used when the external resource is not exclusively used, and is the threshold of a memory size that starts the instructions that cause a delay;

k is a parameter for adjusting the value to be obtained on the basis of the sum of the values of the counters; and N is the sum of the values of the counters.

17. The method of claim 16, further comprising the step of: providing the value of the counter in association with the thread having a method is executed, where a value of a number-of-execution-times counter provided for the method in a thread is increased.

18. A method for preventing a delay in execution time of one or more instructions each being executed by exclusively using a database resource in a JAVA processing system for executing one or more threads in each of which the instructions to be executed by exclusively using the database resource are executed, the method comprising the steps of:

executing at least one instruction selected from a set of an instruction to acquire exclusive-use of the external resource and an instruction to release the exclusive-use thereof in the thread;

performing at least one of increasing or decreasing, in accordance with execution of at least one of the instruction to acquire exclusive-use of the external resource or the instruction to release the exclusive-use thereof, a value of a corresponding one of counters respectively associated with the threads; and controlling, in accordance with the value of the counter or a change in the value of the counter, an execution order of the one or more instructions to be executed by exclusively using the database resource, and garbage collection or just in time (JIT) compiling;

wherein the controlling is adapted to execute the garbage collection or JIT compiling where, a memory size usable for memory allocation to be performed during execution of a program is smaller than a value obtained on the basis of a sum of values of counters;

wherein the value obtained on the basis of the sum of the values of the counters is calculated in accordance with a formula: $T/(1+k \times N)$, where T is a threshold of a memory size that is used when the external resource is not exclusively used, and is the threshold of a memory size that starts the garbage collection or JIT compiling;

k is a parameter for adjusting the value to be obtained on the basis of the sum of the values of the counters; and N is the sum of the values of the counters.

\* \* \* \* \*